United States Patent
Matsuhashi et al.

(10) Patent No.: US 8,294,815 B2
(45) Date of Patent: Oct. 23, 2012

(54) CAMERA SUPPORT DEVICE

(75) Inventors: Yuki Matsuhashi, Chiba (JP); Mamoru Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 12/710,777

(22) Filed: Feb. 23, 2010

(65) Prior Publication Data
US 2010/0225803 A1  Sep. 9, 2010

(30) Foreign Application Priority Data
Mar. 3, 2009  (JP) .................. 2009-049686

(51) Int. Cl.
H04N 5/225 (2006.01)
G03B 17/00 (2006.01)
F16M 11/02 (2006.01)
F16M 11/38 (2006.01)

(52) U.S. Cl. .................. 348/373; 248/178.1; 248/177.1; 248/168; 248/166; 396/428

(58) Field of Classification Search .................. 348/373; 396/419, 428
See application file for complete search history.

(56) References Cited

U.S. PATENT DOCUMENTS

| 4,648,698 A | 3/1987 | Iwasaki | |
| 2005/0232625 A1* | 10/2005 | Chapman | 396/428 |

FOREIGN PATENT DOCUMENTS

| JP | 48-029428 U | | 4/1973 |
| JP | 62-055725 U | | 4/1987 |
| JP | 63-30549 | | 6/1988 |
| JP | 09-166279 | | 6/1997 |
| JP | 2004 271867 | * | 9/2004 |
| JP | 2004-271867 A | | 9/2004 |
| JP | 2005 276487 | * | 10/2005 |
| JP | 2005-276487 A | | 10/2005 |

* cited by examiner

Primary Examiner — Nicholas Giles
Assistant Examiner — Stephen Coleman
(74) Attorney, Agent, or Firm — Wolf, Greenfield & Sacks, P.C.

(57) ABSTRACT

A camera support device includes: a first rotating member to which an imaging device is fixed; a second rotating member having first and second arm portions interposing the first rotating member therebetween and supporting the first rotating member turnable by the first and second arm portions; a support member interposed between the first and second arm portions and supporting the second rotating member turnably; an operation member changing a distance between the first and second arm portions; a first engagement portion formed by a serration formed on a contact surface of at least one of the first and second arm portions and the first rotating member; and a second engagement portion formed by a serration formed on a contact surface of at least one of the first and second arm portions and the support member and being set to have an engagement depth different from that of the first engagement portion.

2 Claims, 10 Drawing Sheets

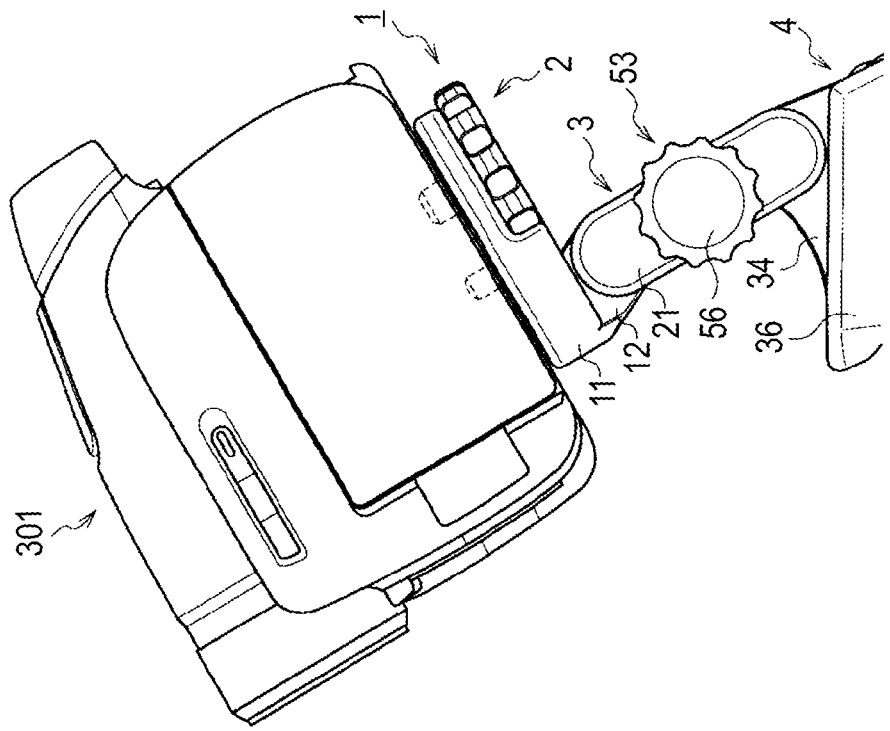
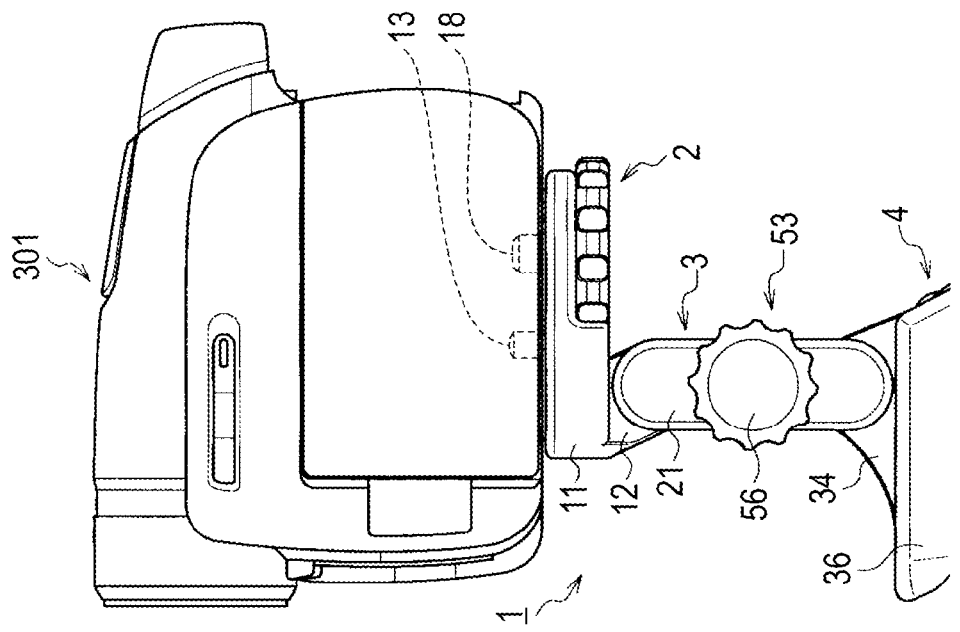

CAMERA SUPPORT DEVICE

BACKGROUND OF THE INVENTION

1. Field of the Invention

The present invention relates to a camera support device that can support a camera such as a still camera or a video camera and adjust the attitude of the supported camera.

2. Description of the Related Art

Generally, in camera support devices that support cameras, rotating members for changing the attitudes of the supported cameras are disposed. In such camera support devices, the rotating members can be fixed or released by operating handles.

A technology relating to a rotating member that is disposed in a camera support device, for example, is disclosed in JP-A-9-166279. In JP-A-9-166279, an adjustable fixing device that can freely adjust the attitude of a camera is disclosed. In the adjustable fixing device disclosed in JP-A-9-166279, when a fixing screw tool disposed on the side portion of a case main body is fastened, two shaft pressing tools are pressed in the shaft directions opposite to each other through an orthogonal pressing tool. As a result, two adjustable joints, which can turn, are pressed by the two shaft pressing tools so as to be fixed simultaneously.

SUMMARY OF THE INVENTION

However, in the adjustable fixing device disclosed in JP-A-9-166279, when the fixing screw tool is loosened, the fixing of the two adjustable joints is simultaneously released. Accordingly, there is a problem in that the adjustment of the angle of the two adjustable joints is complicated. In addition, when the fixing screw tool is loosened, the adjustable joints are turned due to the weight of the supported camera. Accordingly, there is a problem in that the camera may collide with the tripod or a hand.

Thus, there is a need for fixing and releasing two rotating members by using one operation member and generating a time difference between the fixing and the releasing of the two rotating members.

According to an embodiment of the present invention, there is provided a camera support device including: a first rotating member; a second rotating member; a support member; an operation member; a first engagement portion; and a second engagement portion. To the first rotating member, an imaging device is fixed. The second rotating member has a first arm portion and a second arm portion interposing the first rotating member therebetween and supports the first rotating member to be able to be turned by the first arm portion and the second arm portion. The support member is interposed between the first arm portion and the second arm portion and supports the second rotating member to be able to turn.

The operation member changes a distance between the first arm portion and the second arm portion. The first engagement portion is formed by a serration formed on a contact surface of at least one of the first arm portion and the second arm portion and the first rotating member. The second engagement portion is formed by a serration formed on a contact surface of at least one of the first arm portion and the second arm portion and the support member and is set to have an engagement depth that is different from that of the first engagement portion.

In the camera support device according to the embodiment of the present invention, as the first arm portion and the second arm portion are separated from each other by the operation member, first, the first engagement portion or the second engagement portion is unfastened. Accordingly, the fixing of the first rotating member or the second rotating member is released. Thereafter, when the first arm portion and the second arm portion are separated further, the remaining engagement portion is unfastened, and the fixing of the remaining rotating member is released.

According to the embodiment of the present invention, the two rotating members can be fixed or released by using one operation member, and the two rotating members can be fixed or released at different times.

BRIEF DESCRIPTION OF THE DRAWINGS

FIG. 4A is an explanatory diagram illustrating a state in which a video camera is supported by a camera support device according to the first embodiment. FIG. 4B is an explanatory diagram illustrating a state in which a second rotating member is turned to the front side from the state illustrated in FIG. 4A.

DESCRIPTION OF THE PREFERRED EMBODIMENTS

Figure 1:
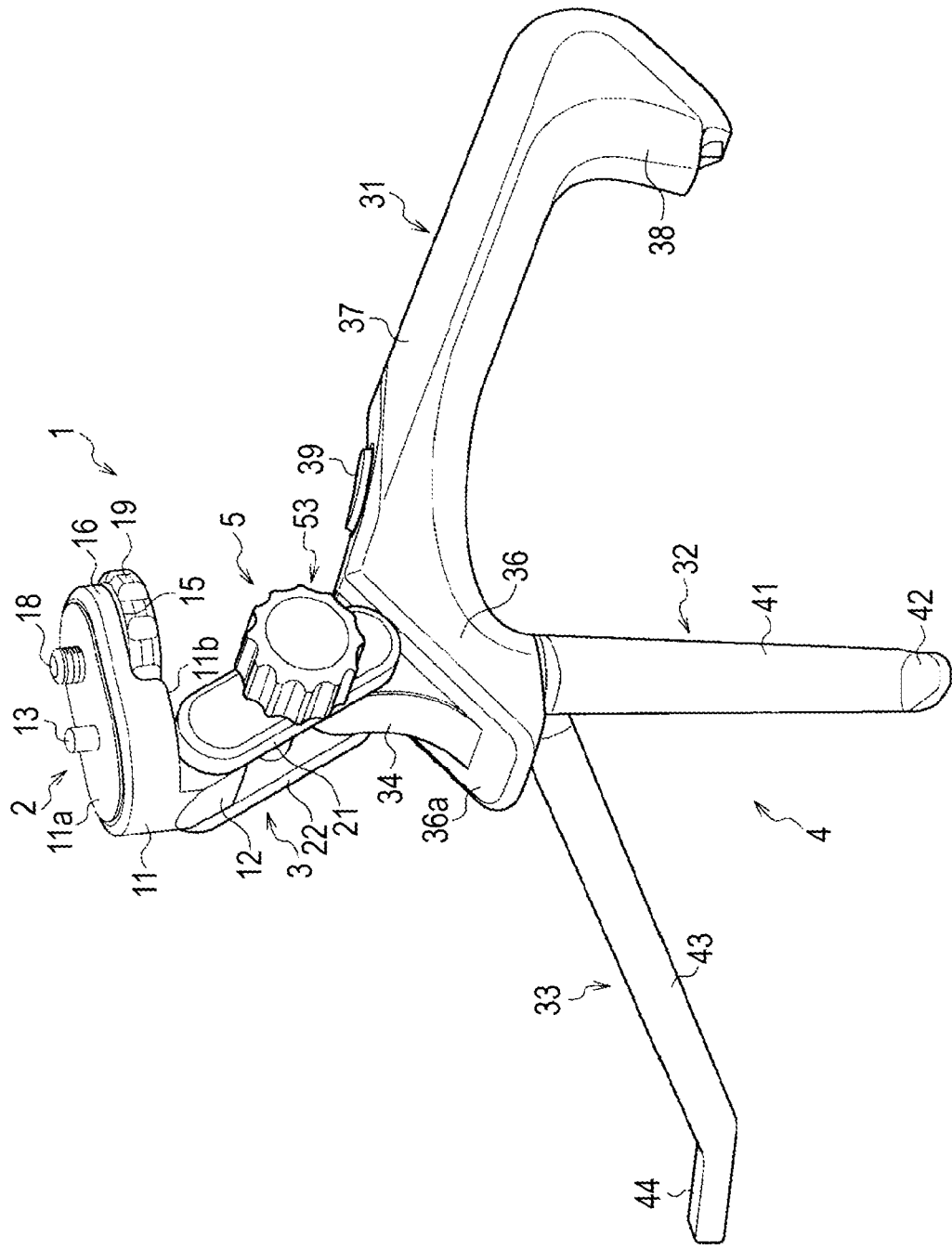
FIG. 1 is a perspective view of a camera support device according to a first embodiment of the present invention.

Hereinafter, coil parts according to embodiments of the present invention will be described with reference to FIGS. 1 to 10. To each member common in the drawings, a same reference numeral is assigned. Descriptions will be followed in the following order.

1. First Embodiment
2. Second Embodiment
3. Third Embodiment
4. Fourth Embodiment
5. Fifth Embodiment

1. First Embodiment

Camera Support Device

First, a camera support device according to a first embodiment of the present invention will be described with reference to FIG. 1.

FIG. 1 is a perspective view of a camera support device according to the first embodiment of the present invention.

The camera support device 1 includes a first rotating member 2, a second rotating member 3, a support member 4, and a lock mechanism 5 that fixes the first rotating member 2 and the second rotating member 3 and releases the fixing thereof. The first rotating member 2 is configured by a fixing base 11 to which an imaging device is fixed and a bearing portion 12 that is formed to be continuous from the fixing base 11.

The fixing base 11 is formed from an approximate rectangular plate body having an appropriate thickness. On the surface 11a of the fixing base 11, a positioning protrusion 13 for determining the position of an imaging device (see FIG. 4A) is disposed. In addition, on the lower face 11b of the fixing base 11, a stair portion 15 is disposed. By arranging the stair portion 15, a thin plate portion 16 is formed on the fixing base 11.

A fixing screw 18 screwing into a tripod screw hole (not shown) disposed in the imaging device is formed through the thin plate potion 16 of the fixing base 11. A fixing operation knob 19 is disposed on the base end portion of the fixing screw 18. The fixing operation knob 19 is disposed on the stair portion 15 of the fixing base 11. A bearing portion 12 of the first rotating member 2 protrudes from the lower face 11b of the fixing base 11. The bearing portion 12 will be described later in detail with reference to FIG. 2.

The second rotating member 3 is formed by a first arm portion 21 and a second arm portion 22. By engaging the first arm portion 21 and the second arm portion 22 with the bearing portion 12 of the first rotating member 2 so as to be able to turn, the first rotating member 2 is supported by the second rotating member 3 so as to be able to turn. The first and second arm portions 21 and 22 of the second rotating member 3 will be described later in detail with reference to FIG. 2.

The support member 4 has a first support leg 31, a second support leg 32, a third support leg 33, and a bearing portion 34. The first support leg 31 is formed in an approximate letter "U" shape and serves as a grip for gripping the camera support device 1. The first support leg 31 has a base portion 36, a leg portion 37 that is formed to be continuous to the base portion 36, and a mounting portion 38 that is formed to be continuous to the leg portion 37.

The base portion 36 is formed in an approximately rectangular parallelepiped and has a flat face 36a. The bearing portion 34 is disposed on the flat face 36a of the base portion 36. In the leg portion 37, a connection terminal (not shown) for electrically connecting the imaging device and the camera support device 1 through an operation switch 39 and a cable are disposed. As the operation switch, for example, there is a zoom button, a record button, or the like. The mounting portion 38 faces the base portion 36 and is brought into contact with a mounting face such as a ground surface or a desk.

The second support leg 32 is formed in an approximate letter "L". The second support leg 32 has a leg portion 41 and a mounting portion 42 that is continuous to the leg portion 41. The leg portion 41 is connected to the base portion 36 of the first support leg 31 so as to be able to turn. The mounting portion 42 is tilted with respect to the leg portion 41 and is brought into contact with a mounting face such as a ground surface or a desk.

The third support leg 33 has a same shape as that of the second support leg 32. The third support leg 33 has a leg portion 43 that is connected to the base portion 36 of the first support leg 31 so as to be able to turn and a mounting portion 44 that is continuous to the leg portion 43 to be in a tilted state with respect to the leg portion 43.

The bearing portion 34 supports the second rotating member 3 to be able to turn. This bearing portion 34 is interposed between the first and second arm portions 21 and 22 of the second rotating member 3. The bearing portion 34 will be described later in detail with reference to FIG. 2.

Lock Mechanism

Next, the lock mechanism 5 will be described with reference to FIG. 2.

Figure 2:
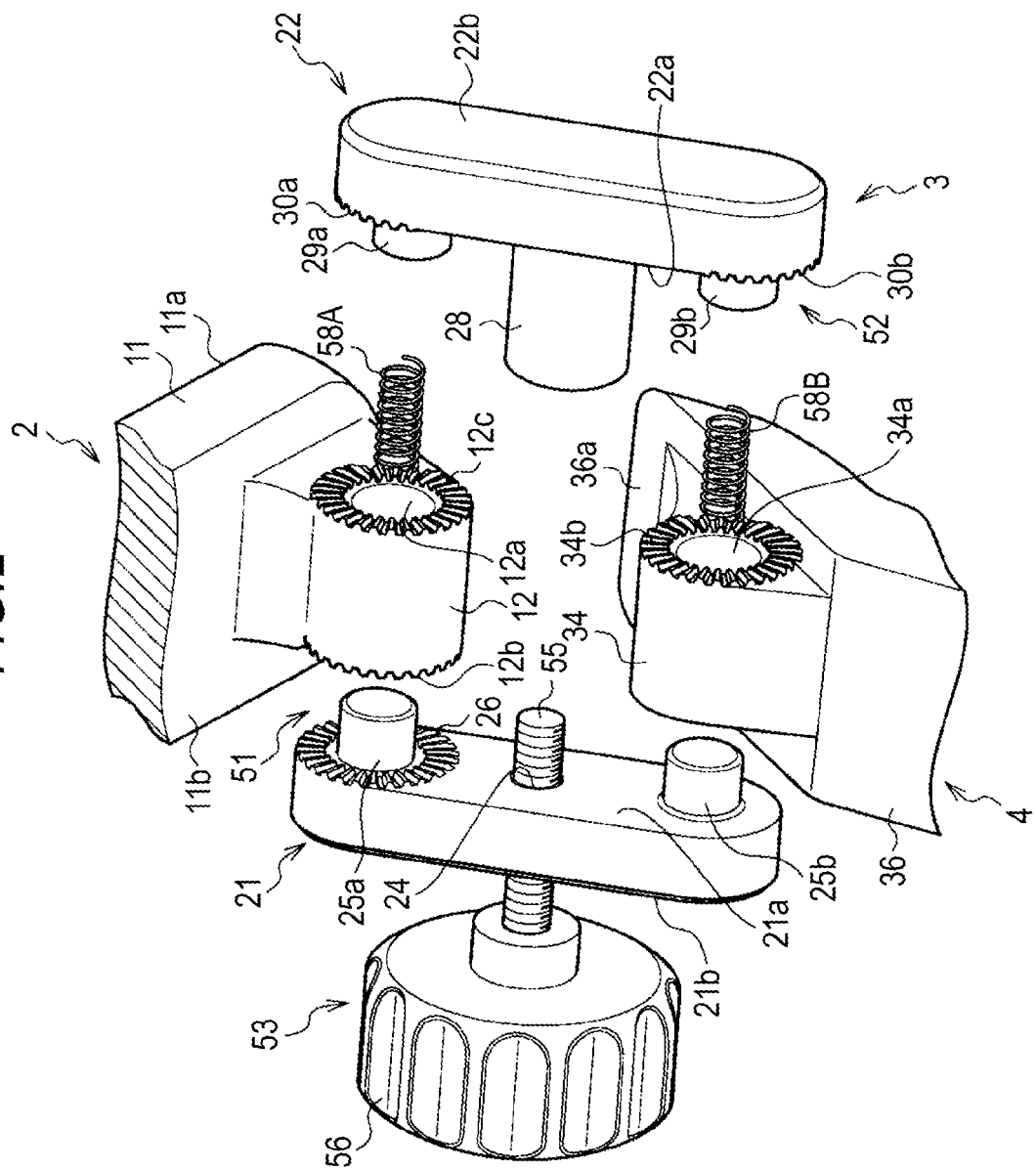
FIG. 2 is an exploded perspective view of a camera support device according to the first embodiment.

FIG. 2 is an exploded perspective view of the camera support device 1.

The lock mechanism 5 is configured by a first engagement portion 51, a second engagement portion 52, and an operation member 53. The first engagement portion 51 is disposed by forming serrations on contact surfaces of the first and second arm portions 21 and 22 and the bearing portion 12 of the first rotating member 2. In addition, the second engagement portion 52 is disposed by forming a serration on a contact surface of the second arm portion 22 and the bearing portion 34 of the support member 4.

First, the bearing portion 12 of the first rotating member 2 will be described. In the bearing portion 12, a circular bearing hole 12a that is formed by perforating the fixing base 11 in the direction along the shorter side is disposed. In addition, first protrusion shafts 25a of the first arm portion 21 and the second arm portion 22, to be described later, are fitted into the bearing hole 12a so as to be slidable.

In addition, serrations 12b and 12c that form parts of the first engagement portion 51 are disposed in the bearing portion 12. These serrations 12b and 12c are formed on the peripheries of both openings of the bearing hole 12a and are formed by a convex portion and a concave portion extending in the radial direction of the bearing hole 12a. The serrations 12b and 12c are formed in a same shape. In other words, the serrations 12b and 12c are formed such that the width of the convex portion and the depth of the concave portion (groove) are the same.

Next, the bearing portion 34 of the support member 4 will be described.

In the bearing portion 34, a bearing hole 34a that is formed by perforating the base portion 36 in the direction along the shorter side thereof is disposed. In addition, second protrusion shafts 25b of the first arm portion 21 and the second arm portion 22, to be described later, are fitted into the bearing hole 34a so as to be slidable. The length of the bearing portion 34 in the axial direction (the direction along the shorter side of the base portion 36) is set to be approximately the same as the length of the bearing portion 12 in the axial direction (the direction along the shorter side of the fixing base 11).

In addition, a serration 34b that forms a part of the second engagement portion 52 is disposed in the bearing portion 34. This serration 34b is formed on the periphery of one opening of the bearing hole 34a and is formed by a convex portion and a concave portion extending in the radial direction of the bearing hole 34a. The serration 34b is formed in a same shape as those of the serrations 12b and 12c of the bearing portion 12. In other words, the serration 34b is formed such that the width of the convex portion and the depth of the concave portion (groove) are the same as the width of the convex portions of the serrations 12b and 12c and the depth of the concave portions (grooves) thereof.

Next, the first arm portion 21 of the second rotating member 3 will be described.

The first arm portion 21 is formed in an approximately rectangular shape that is thin and long. The first arm portion 21 has an inner face 21a that faces the second arm portion 22 and an outer face 21b that is located on a side opposite to the inner face 21a. In an approximate center portion of the first arm portion 21, a through hole 24 that is formed to pass through the inner face 21a and the outer face 21b is disposed. Into this through hole 24, a tightening screw 55 of the operation member 53 is inserted.

On the inner face 21a of the first arm portion 21, the first protrusion shaft 25a, the second protrusion shaft 25b, and a serration 26 are disposed. The first protrusion shaft 25a is disposed on one end of the first arm portion 21 in the longitudinal direction. The first protrusion shaft 25a is formed in a cylinder shape that protrudes from the inner face 21a of the first arm portion 21 to be approximately perpendicular thereto. The first protrusion shaft 25a is fitted into the bearing hole 12a of the first rotating member 2 so as to be slidable.

The second protrusion shaft 25b is disposed on the other end of the first arm portion 21 in the longitudinal direction. The second protrusion shaft 25b, similarly to the first protrusion shaft 25a, is formed in a cylinder shape that protrudes from the inner face 21a of the first arm portion 21 to be approximately perpendicular thereto. The second protrusion shaft 25b is fitted into the bearing hole 34a of the support member 4 to be slidable.

The serration 26 is formed on the periphery of the first protrusion shaft 25a. The serration 26 is formed by a convex portion and a concave portion extending in the radial direction of the first protrusion shaft 25a. This serration 26 is engaged with the serration 12b of the bearing portion 12. The serration 26 is formed in a same shape as that of the serrations 12b and 12c of the bearing portion 12.

Next, the second arm portion 22 of the second rotating member 3 will be described.

The second arm portion 22, similarly to the first arm portion 21, is formed in an approximately rectangular shape that is thin and long. The second arm portion 22 has an inner face 22a that faces the first arm portion 21 and an outer face 22b that is located on a side opposite to the inner face 22a.

On the inner face 22a of the second arm portion 22, a screw threaded portion 28, a first protrusion shaft 29a, a second protrusion shaft 29b, a serration 30a, and a serration 30b are disposed. The screw threaded portion 28 protrudes from the center portion of the inner face 22a to be approximately perpendicular thereto and has a screw hole (not shown) perpendicular to the inner face 22a. Into this screw hole, a tightening screw 55 of the operation member 53 screws. The length L (hereinafter, referred to as a "protrusion length L") of the screw threaded portion 28 that protrudes from the inner face 22a is set to be almost the same as the length of the bearing portions 12 and 34 in the axial direction.

The first protrusion shaft 29a is disposed in one end of the second arm portion 22 in the longitudinal direction. This first protrusion shaft 29a is formed in a cylinder shape that protrudes from the inner face 22a of the second arm portion 22 to be approximately perpendicular thereto. The first protrusion shaft 29a is fitted into the bearing hole 12a of the first rotating member 2 so as to be slidable.

The second protrusion shaft 29b is disposed in the other end of the second arm portion 22 in the longitudinal direction. This second protrusion shaft 29b, similarly to the first protrusion shaft 29a, is formed in a cylinder shape that protrudes from the inner face 22a of the second arm portion 22 to be approximately perpendicular thereto. The second protrusion shaft 29b is fitted into the bearing hole 34a of the support member 4 so as to be slidable.

The serration 30a is formed on the periphery of the first protrusion shaft 29a. The serration 30a is formed by a convex portion and a concave portion extending in the radial direction of the first protrusion shaft 29a. This serration 30a is engaged with the serration 12c of the bearing portion 12. The serration 30a is formed in a same shape as that of the serrations 12b and 12c of the bearing portion 12.

The serration 30b is formed on the periphery of the second protrusion shaft 29b. The serration 30b is formed by a convex portion and a concave portion extending in the radial direction of the second protrusion shaft 29b. This serration 30b is engaged with the serration 34b of the bearing portion 34. The serration 30b is formed in a same shape as that of the serration 34b of the bearing portion 34. In other words, the serrations 12b, 12c, 26, 30a, 30b, and 34b are formed in the same shape.

In the bearing hole 12a of the first rotating member 2 and the bearing hole 34a of the support member 4, helical compression springs 58A and 58B each representing a concrete example of the biasing member are disposed. The helical compression spring 58A is compressed by being pressurized by the first protrusion shafts 25a and 29a of the first and second arm portions 21 and 22. In addition, the helical compression spring 58B is compressed by being pressurized by the second protrusion shafts 25b and 29b of the first and second arm portions 21 and 22. In other words, the helical compression springs 58A and 58B bias the first arm portion 21 and the second arm portion 22 in directions separating from each other.

The operation member 53 changes a distance between the first arm portion 21 and the second arm portion 22. This operation member 53 is formed by the tightening screw 55 and a rotation operation knob 56 that is disposed in the base end portion of the tightening screw 55. The tightening screw 55 screws into the screw threaded portion 28 of the second arm portion 22 by passing through the through hole 24 of the first arm portion 21.

By screwing the tightening screw 55 into the screw threaded portion 28, the first arm portion 21 and the second arm portion 22 approach each other. Then, when the screw threaded portion 28 is brought into contact with the inner face 21a of the first arm portion 21, the first arm portion 21 and the second arm portion 22 tighten the bearing portion 12 and the bearing portion 34. On the other hand, by rotating the tightening screw 55 in a direction being unfastened from the screw threaded portion 28, the first arm portion 21 and the second arm portion 22 are separated from each other, whereby the tightening of the bearing portion 12 and the bearing portion 34 are loosened.

Engagement Depth of Engagement Portion

Next, the engagement depths of the first engagement portion 51 and the second engagement portion 52 will be described with reference to FIG. 3.

Figure 3:
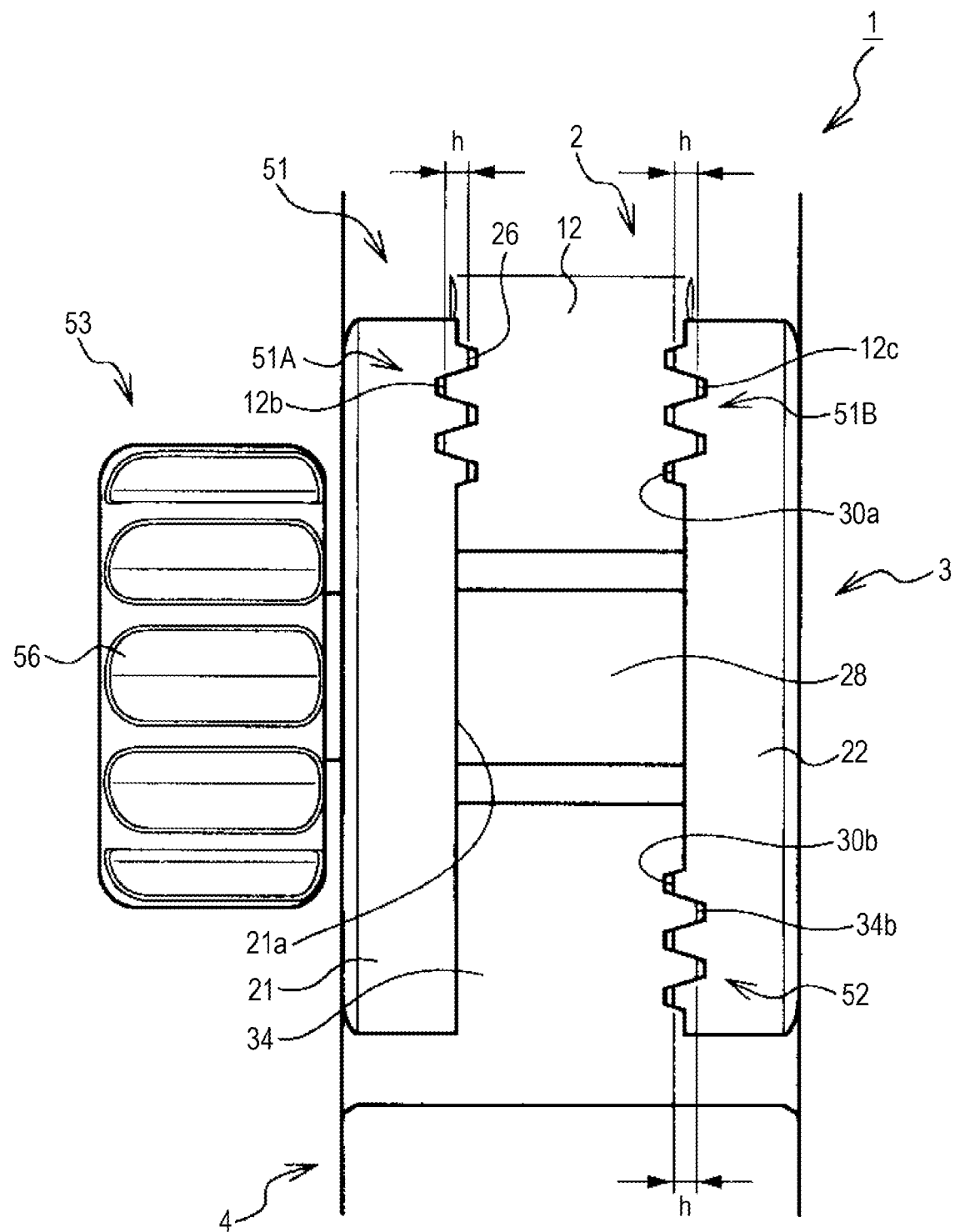
FIG. 3 is an explanatory diagram illustrating engagement portions of a camera support device according to the first embodiment.

FIG. 3 is an explanatory diagram illustrating the first engagement portion 51 and the second engagement portion 52 of the camera support device 1.

The first engagement portion 51 is formed by a first arm engagement portion 51A that is configured by the serration 12b and the serration 26 and a second arm engagement portion 51B that is configured by the serration 12c and the serration 30a. Each of engagement depths of the first arm engagement portion 51A and the second arm engagement portion 51B is h (hereinafter, referred to as an "engagement depth h"). Accordingly, the entire engagement depth of the first engagement portion 51 is an engagement depth 2h.

On the other hand, the second engagement portion 52 is configured by the serration 34b and the serration 30b. Accordingly, the engagement depth of the second engagement portion 52 is an engagement depth h. Thus, the second engagement portion 52 has an engagement depth less than that of the first engagement portion 51 (h<2h).

In a case where the screw threaded portion 28 is brought into contact with the inner face 21a of the first arm portion 21 by screwing the tightening screw 55 into the screw threaded portion 28, the first engagement portion 51 and the second engagement portion 52 are in the engaged state, respectively. As a result, the turning of the first rotating member 2 and the second rotating member 3 is fixed.

When the operation member 53 is rotated in a direction in which the tightening screw 55 is unfastened from the state in which the turning of the first and second rotating members 2 and 3 is fixed, the first arm portion 21 and the second arm portion 22 are separated from each other. Then, when the first arm portion 21 and the second arm portion 22 are separated apart from each other by a predetermined length L1 (L1<h) to be greater than the protruded length L of the screw threaded portion 28, the convex portion of the serration 30b of the second engagement portion 52 can pass past the convex portion of the serration 34b.

As a result, the fixing of the second rotating member 3 is released, and the second rotating member 3 can be turned. At this time, the convex portions of the serrations 26 and 30a of the first engagement portion 51 can rarely pass past the convex portions of the serrations 12b and 12c. Accordingly, the fixing of the first rotating member 2 is not released, and only the fixing of the second rotating member 3 is released.

Thereafter, when the operation member is rotated further in the direction in which the tightening screw 55 is unfastened, the first arm portion 21 and the second arm portion 22 are separated farther from each other. Then, when the first and second arm portions 21 and 22 are separated from each other by a predetermined length L2 (L1<L2<2h) to be greater than the protruded length L, the convex portions of the serrations 26 and 30a of the first engagement portion 51 can pass past the convex portions of the serrations 12b and 12c. As a result, the fixing of the first rotating member 2 is released, and the first rotating member 2 can be turned. In other words, the fixing of both the first rotating member 2 and the second rotating member 3 is released.

Angle Adjustment of Imaging Device

Next, the angle adjustment of the imaging device supported by the camera support device 1 will be described with reference to FIGS. 4A and 4B.

FIG. 4A is an explanatory diagram illustrating a state in which the video camera 301 is supported by the camera support device 1. FIG. 4B is an explanatory diagram illustrating a state in which the second rotating member 3 is turned to the front side from the state illustrated in FIG. 4A.

In the state illustrated in FIG. 4A, the first rotating member 2 and the second rotating member 3 are fixed, and the attitude of the video camera 301 fixed to the first rotating member 2 is stable. In order to adjust the angle of the video camera 301 from the state, the fastening screw 55 (see FIG. 2) of the operation member 53 is rotated in the unfastening direction.

As a result, first, only the fixing of the second rotating member 3 is released. Accordingly, a user can adjust the angle of the video camera 301 by only turning the second rotating member 3. At this moment, the fixing of the first rotating member 2 is not released. Thus, even when the angle is adjusted with the video camera 301 gripped, the first rotating member 2 scarcely turns. Accordingly, the angle of the video camera 301 can be adjusted in an easy manner.

For example, when the video camera 301 is taken down to the front side with being gripped, the second rotating member is turned to the front side, and the state illustrated in FIG. 4B can be formed. Thereafter, when the screw threaded potion 28 is brought into contact with the inner face 21a of the first arm portion 21 by screwing the fastening screw 55 (see FIG. 2) of the operation member 53, the second rotating member 3 is fixed again. As a result, the camera support device 1 can stably support the video camera 301 at an angle illustrated in FIG. 4B.

Usage Example of Camera Support Device

Next, a usage example of the camera support device 1 will be described with reference to FIGS. 5A and 5B.

Figure 5A:
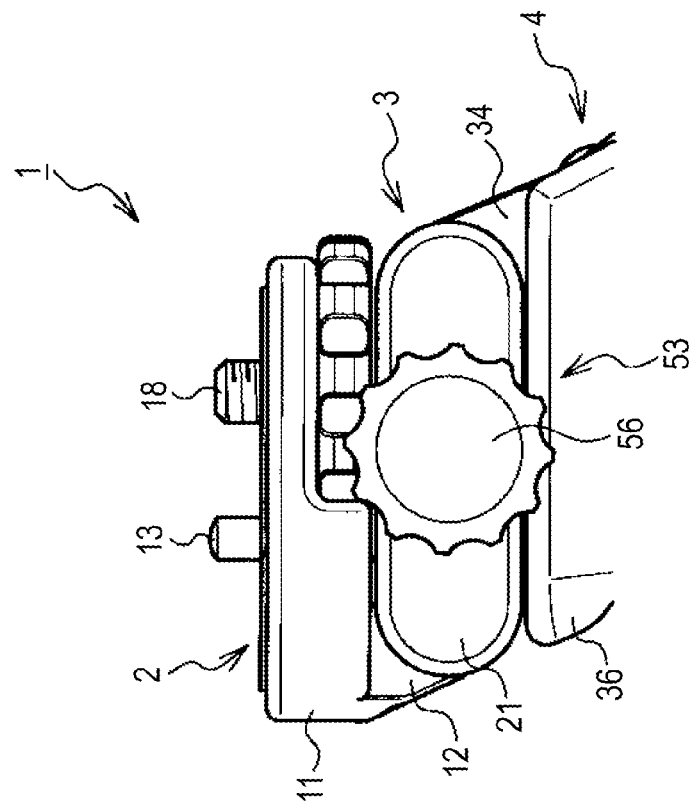
FIG. 5A is an explanatory diagram illustrating a state in which a first rotating member and the second rotating member are turned from the state illustrated in FIG. 4B.

FIG. 5A is an explanatory diagram illustrating a state in which the first rotating member and the second rotating member are turned from the state illustrated in FIG. 4B. FIG. 5B is an explanatory diagram illustrating a state in which the first rotating member and the second rotating member are folded.

In the camera support device 1, the first rotating member 2 and the second rotating member 3 can be turned simultaneously. When the first rotating member 2 and the second rotating member 3 are turned simultaneously, it is preferable that the imaging device (video camera 301) is detached from the first rotating member 2.

By turning the first rotating member 2 and the second rotating member 3, the attitude and the position of the imaging device can be changed in accordance with the usage situation. For example, when the first rotating member 2 is turned so as to overlap the second rotating member 3 from the state illustrated in FIG. 4B, and the second rotating member 3 is turned to the front side, the imaging device can be disposed on an approximate center of the support member 4 (see FIG. 5A).

Figure 5B:
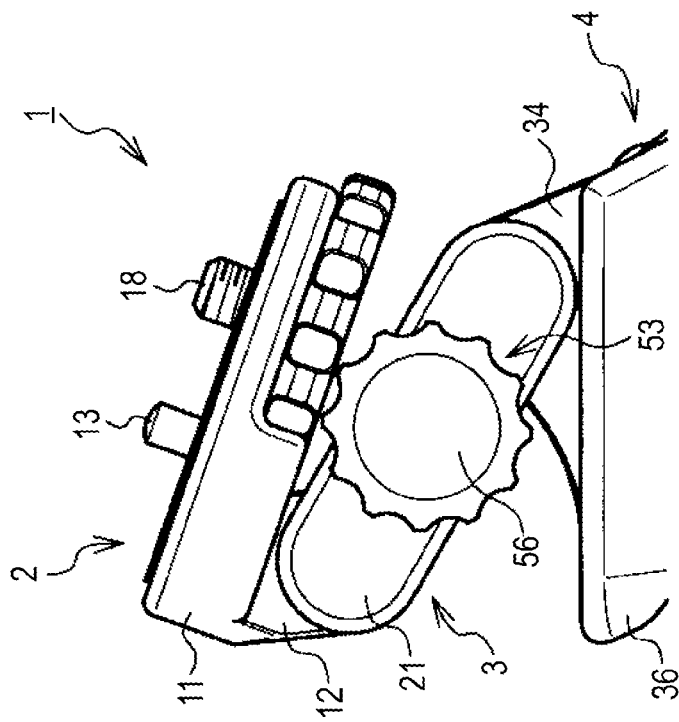
FIG. 5B is an explanatory diagram illustrating a state in which the first rotating member and the second rotating member are folded.

When the first rotating member 2 and the second rotating member 3 are turned further from the state illustrated in FIG. 5A, the first rotating member and the second rotating member can be in a folded state (see FIG. 5B). In this state, the first rotating member 2 and the second rotating member 3 form an approximately rectangular parallelepiped, so that the exterior size of the camera support device can be decreased. As a result, the camera support device 1 can be formed in a shape having excellent portability.

In addition, in order to fix the first rotating member 2 and the second rotating member 3 that are turned at a desired attitude, the first arm portion 21 and the second arm portion 22 approach each other by screwing the tightening screw 55 (see FIG. 2) of the operation member 53 into the screw threaded portion 28. Accordingly, first, the convex portions of the serrations 26 and 30a of the first engagement portion 51 rarely can pass past the convex portions of the serrations 12b and 12c. As a result, the first rotating member 2 is fixed.

Thereafter, when the tightening screw 55 further screws into the screw threaded portion 28, the first arm portion 21 and the second arm portion 22 further approach each other. As a result, the convex portion of the serration 30b rarely can pass past the convex portion of the serration 34b, whereby the second rotating member 3 is fixed.

Advantages of First Embodiment

As described above, according to the camera support device 1, the first rotating member 2 and the second rotating member 3 can be fixed or released by the operation member 53, and the fixing and the releasing of the first rotating member 2 and the second rotating member 3 can be performed at different times. As a result, the angle adjustment of the supported imaging device can be performed in an easy manner.

In addition, according to the camera support device 1, the helical compression springs 58A and 58B bias the first arm portion 21 and the second arm portion 22 in a direction being separated from each other. Accordingly, when the tightening screw 55 (see FIG. 2) of the operation member 53 is rotated in the direction being unfastened, the first arm portion 21 and the second arm portion 22 can be assuredly separated from each other. As a result, the fixing and the releasing of the first rotating member 2 and the second rotating member 3 can be reliably performed at different times.

2. Second Embodiment

Camera Support Device

Next, a camera support device according to a second embodiment of the present invention will be described with reference to FIG. 6.

Figure 6:
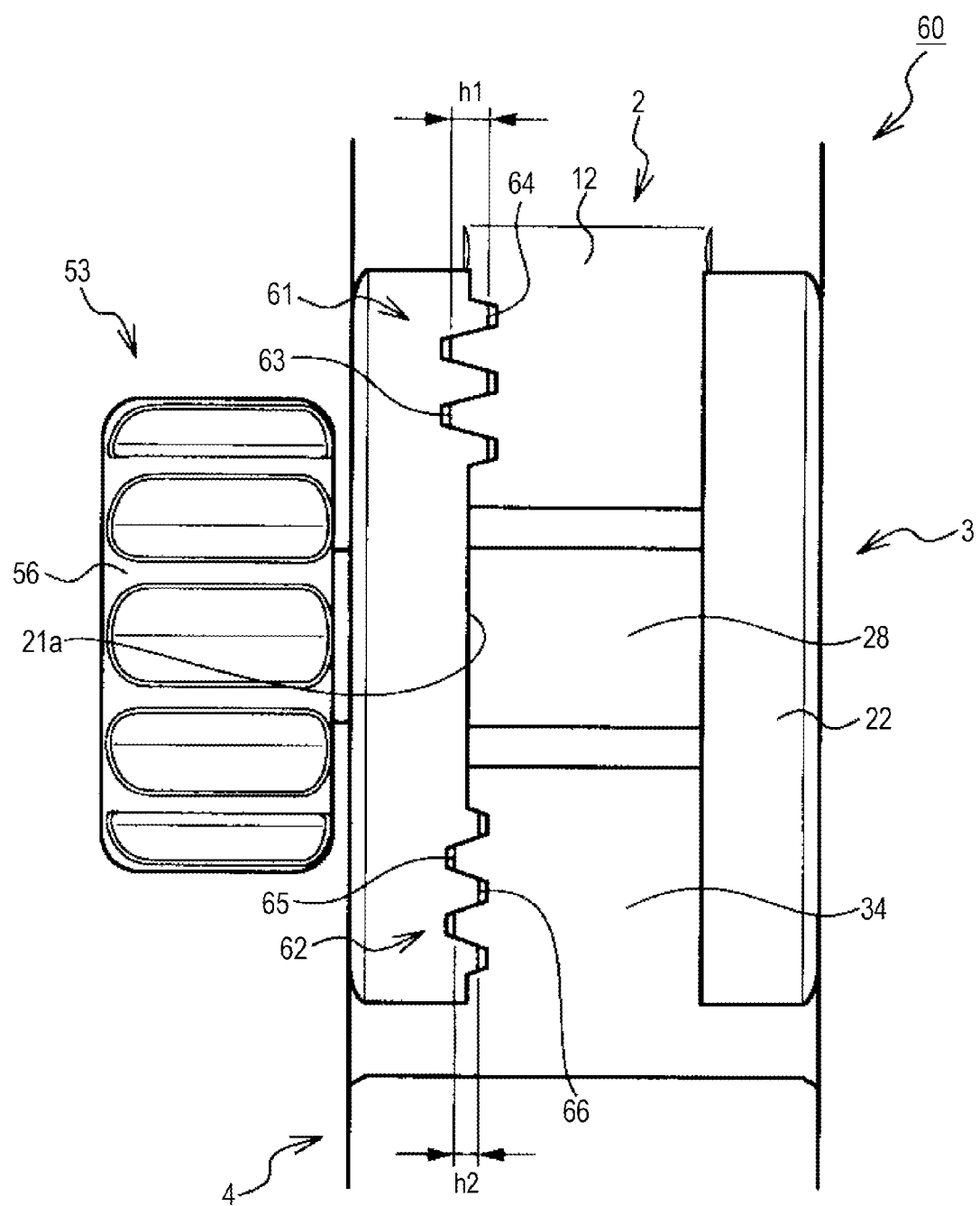
FIG. 6 is a cross-sectional view of a camera support device according to a second embodiment of the present invention.

FIG. 6 is an explanatory diagram of a camera support device according to the second embodiment of the present invention.

The camera support device 60 according to the second embodiment has a same configuration as that of the camera support device 1 according to the first embodiment except for a first engagement portion 61 and a second engagement portion 62. Thus, here, the first engagement portion 61 and the second engagement portion 62 will be described. In addition, to each part common to the camera support device 1, a same reference numeral is assigned, and a duplicate description thereof is omitted here.

The first engagement portion 61 of the camera support device 60 is configured by a high serration 63 disposed in the bearing portion 12 of the first rotating member 2 and a high serration 64 disposed on the inner face 21a of the first arm portion 21. The engagement depth of the first engagement portion 61 is $h_1$ (hereinafter, referred to as an "engagement height $h_1$").

On the other hand, the second engagement portion 62 is configured by a low serration 65 disposed in the bearing portion 34 of the support member 4 and a low serration 66 disposed on the inner face 21a of the first arm portion 21. The engagement depth of the second engagement portion 62 is $h_2$ (hereinafter, referred to as an "engagement height $h_2$"). The engagement depth $h_2$ is less than the engagement depth $h_1$ of the first engagement portion 61 ($h_2 < h_1$).

For example, the operation member 53 is rotated in a direction unfastening the tightening screw 55 (see FIG. 2) from a state in which the first and second rotating members 2 and 3 are fixed. At this moment, a convex portion of the low serration 66 of the second engagement portion 62 can pass past a convex portion of the low serration portion 65. As a result, only the fixing of the second rotating member 3 is released, and accordingly, the second rotating member 3 can be turned.

Thereafter, when the operation member 53 is rotated further in a direction unfastening the fastening screw 55, the convex portion of the high serration 64 of the first engagement portion 61 can pass past the convex portion of the high serration 63. As a result, the fixing of the first rotating member 2 is released, and accordingly, the first and second rotating members 2 and 3 can be turned.

According to the camera support device 60, the same advantages as those of the camera support device 1 according to the first embodiment can be acquired. In other words, the fixing and the releasing of the first rotating member 2 and the second rotating member 3 can be performed by the operation member 53, and the fixing and the releasing of the first rotating member 2 and the second rotating member 3 can be performed at different times.

3. Third Embodiment

Camera Support Device

Next, a camera support device according to a third embodiment of the present invention will be described with reference to FIG. 7.

Figure 7:
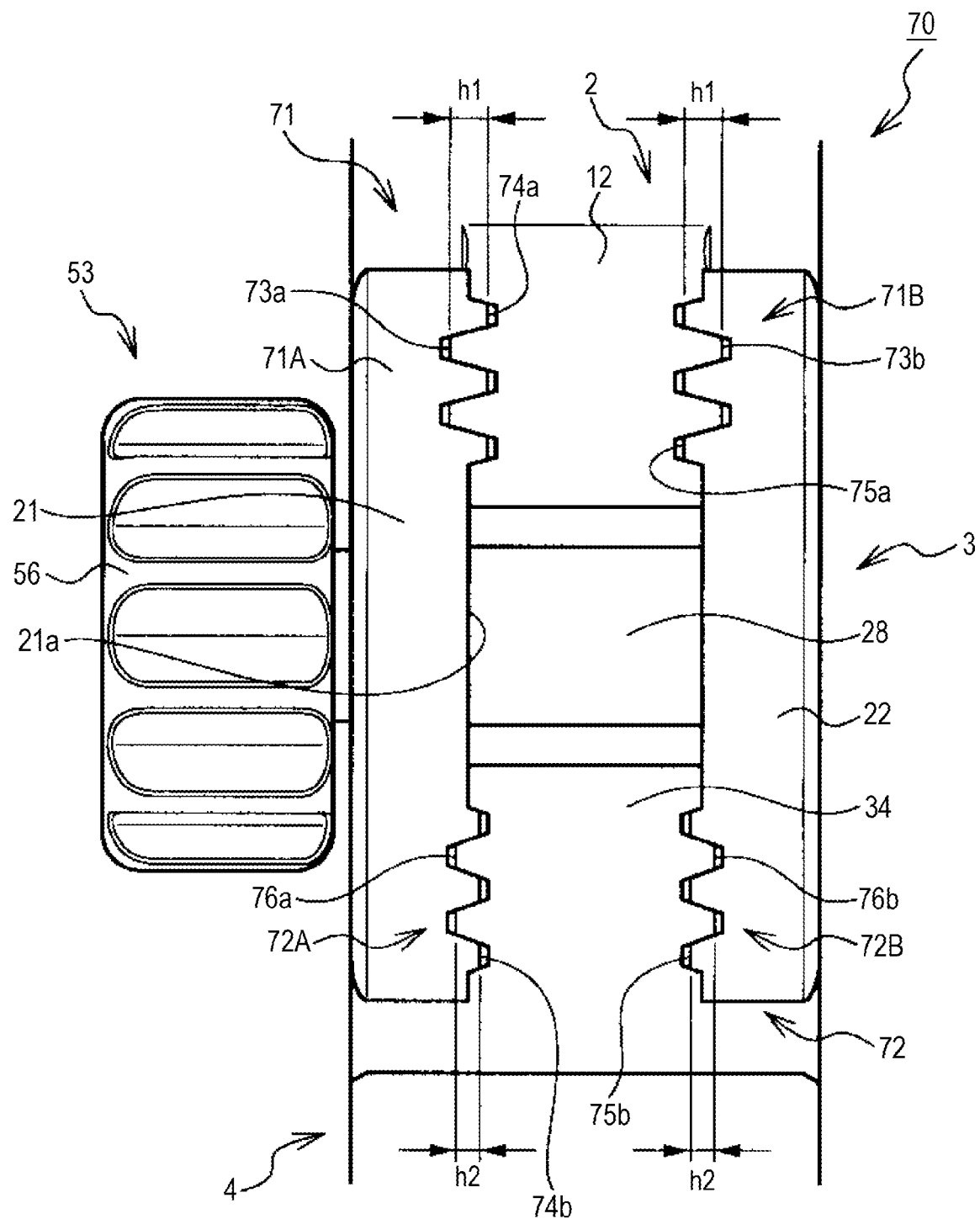
FIG. 7 is a cross-sectional view of a camera support device according to a third embodiment of the present invention.

FIG. 7 is an explanatory diagram of an engagement portion of a camera support device according to the third embodiment of the present invention.

The camera support device 70 according to the third embodiment has a same configuration as that of the camera support device 1 according to the first embodiment except for a first engagement portion 71 and a second engagement portion 72. Thus, here, the first engagement portion 71 and the second engagement portion 72 will be described. In addition, to each part common to the camera support device 1, a same reference numeral is assigned, and a duplicate description thereof is omitted here.

The first engagement portion 71 of the camera support device 70 is configured by a first arm engagement portion 71A and a second arm engagement portion 71B. The first arm engagement portion 71A is formed by a high serration 73a disposed in the bearing portion 12 of the first rotating member 2 and a high serration 74a disposed on the inner face 21a of the first arm portion 21.

The second arm engagement portion 71B is formed by a high serration 73b disposed in the bearing portion 12 of the first rotating member 2 and a high serration 75a disposed on the inner face 22a of the second arm portion 22. Each of the engagement depths of the first arm engagement portion 71A and the second arm engagement portion 71B is an engagement depth of $h_1$. Accordingly, the entire engagement depth of the first engagement portion 71 is $2h_1$.

The second arm engagement portion 72 is formed by a first arm engagement portion 72A and a second arm engagement portion 72B. The first arm engagement portion 72A is configured by a low serration 76a disposed in the bearing portion 34 of the support member 4 and a low serration 74b disposed on the inner face 21a of the first arm portion 21.

The second arm engagement portion 72B is configured by a low serration 76b disposed in the bearing portion 34 of the support member 4 and a low serration 75b disposed on the inner face 22a of the second arm portion 22. Each of the engagement depths of the first arm engagement portion 72A and the second arm engagement portion 72B is an engagement depth of $h_2$ that is less than the engagement depth of $h_1$ ($h_2 < h_1$). Accordingly, the entire engagement depth of the second engagement portion 72 is $2h_2$.

In other words, a depth difference between the first engagement portion 71 and the second engagement portion 72 of the camera support device 70 is twice the engagement depth of the camera support device 60 of the second embodiment. By increasing the difference of the engagement depths, the time difference in the fixing and the releasing of the first rotating member 2 and the second rotating member 3 can be increased.

When the operation member 53 is rotated in a direction in which the tightening screw 55 (see FIG. 2) is unfastened from the state in which the rotary movement of the first and second rotating members 2 and 3 is fixed, first, only the fixing of the second rotating member 3 is released, and the second rotating member 3 can be turned. In other words, the convex portions of the low serrations 74b and 75b of the second engagement portion 72 can pass past the convex portions of the low serrations 76a and 76b.

Thereafter, when the operation member 53 is rotated further in a direction in which the tightening screw 55 is unscrewed, the fixing of the first rotating member 2 is released. Accordingly, the first and second rotating members 2 and 3 can be turned. In other words, the convex portions of the high serrations 74a and 75a of the first engagement portion 71 can pass past the convex portions of the high serrations 73a and 73b.

According to the camera support device 70, the same advantages as those of the camera support device 1 according to the first embodiment can be acquired. In other words, the fixing and the releasing of the first rotating member 2 and the second rotating member 3 can be performed by the operation member 53, and the fixing and the releasing of the first rotating member 2 and the second rotating member 3 can be performed at different times.

4. Fourth Embodiment

Camera Support Device

Next, a camera support device according to a fourth embodiment of the present invention will be described with reference to FIG. 8.

Figure 8:
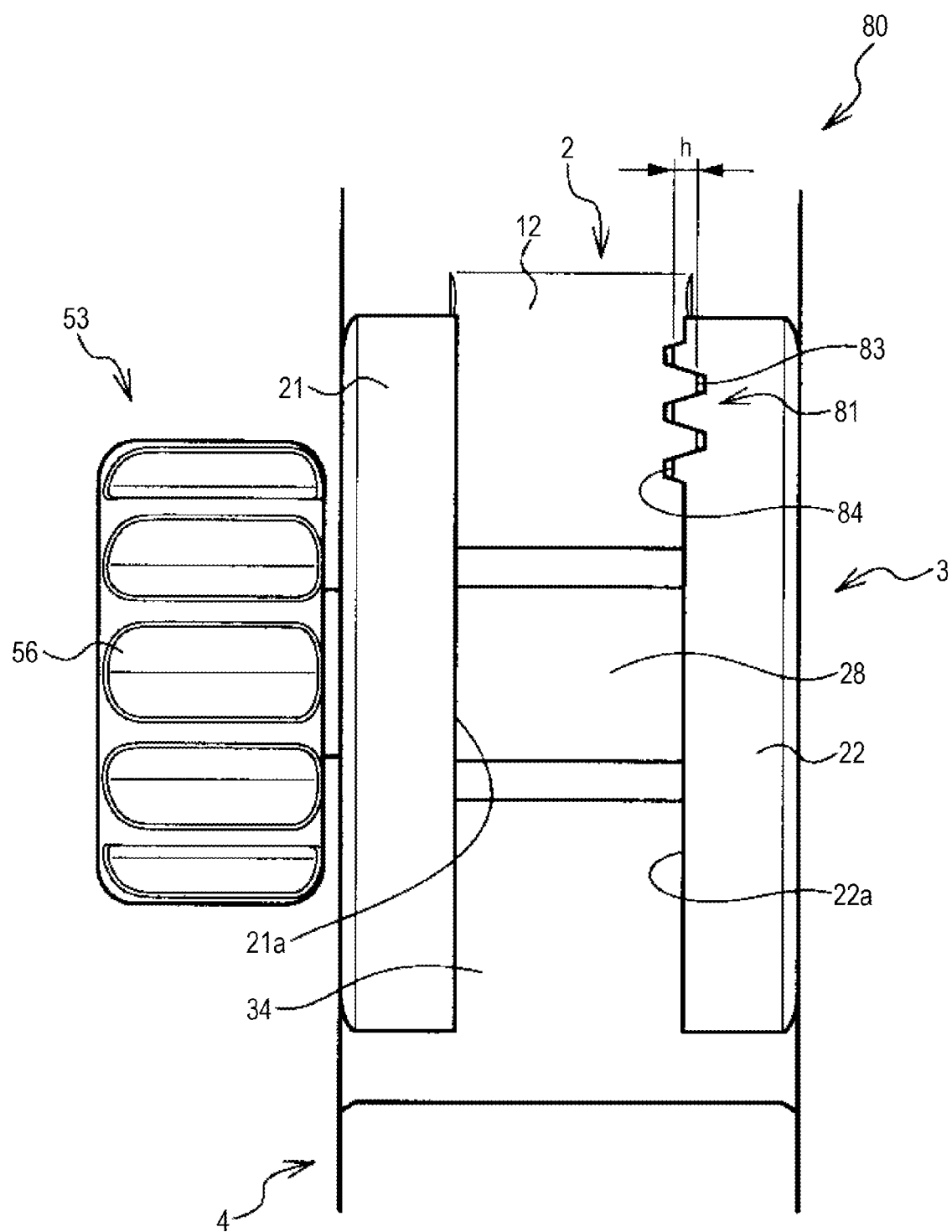
FIG. 8 is a cross-sectional view of a camera support device according to a fourth embodiment of the present invention.

FIG. 8 is an explanatory diagram of an engagement portion of a camera support device according to the fourth embodiment of the present invention.

The camera support device 80 according to the fourth embodiment has a same configuration as that of the camera support device 1 according to the first embodiment except for disposition of an engagement portion 81. Thus, here, the engagement portion 81 will be described. In addition, to each part common to the camera support device 1, a same reference numeral is assigned, and a duplicate description thereof is omitted here.

The engagement portion 81 of the camera support device 80 is configured by a serration 83 disposed in the bearing portion 12 of the first rotating member 2 and a serration 84 disposed on the inner face 22a of the second arm portion 22. The engagement depth of the engagement portion 81 is an engagement depth of h.

On the other hand, on contact surfaces between the bearing portion 34 of the support member 4 and the first and second arm portions 21 and 22, an engagement portion is not formed. Accordingly, the second rotating member 3 is fixed by frictional resistance that occurs on the contact surfaces between the first and second arm portions 21 and 22 and the bearing portion 34.

When the operation member 53 is rotated in a direction unfastening the tightening screw 55 (see FIG. 2) from a state in which the first and second rotating members 2 and 3 are fixed, first, the first and second arm portions 21 and 22 are separated from the bearing portion 34. As a result, only the fixing of the second rotating member 3 is released, and accordingly, the second rotating member 3 can be turned.

Thereafter, when the operation member 53 is rotated further in a direction unfastening the fastening screw 55, the convex portion of the serration 84 of the engagement portion 81 can pass past the convex portion of the serration 83. As a result, the fixing of the first rotating member 2 is released, and accordingly, the first and second rotating members 2 and 3 can be turned.

According to the camera support device 80, the same advantages as those of the camera support device 1 according to the first embodiment can be acquired. In other words, the fixing and the releasing of the first rotating member 2 and the second rotating member 3 can be performed by the operation member 53, and the fixing and the releasing of the first rotating member 2 and the second rotating member 3 can be performed at different times.

In this embodiment, the engagement portion 81 is configured by the bearing portion 12 of the first rotating member 2 and the serrations 83 and 84 disposed on the inner face 22a of the second arm portion 22. However, the engagement portion 81 may be configured by disposing a serration on a contact surface between at least one of the first arm portion 21 and the second arm portion 22 and the bearing portion 12.

In addition, the engagement portion may be configured by disposing a serration on a contact surface between at least one of the first arm portion 21 and the second arm portion 22 and the bearing portion 34 of the support member 4. In such a case, the fixing of the first rotating member 2 is released first, and then, the fixing of the second rotating member 3 is released.

5. Fifth Embodiment

Camera Support Device

Next, a camera support device according to a fifth embodiment of the present invention will be described with reference to FIGS. 9 and 10.

Figure 9:
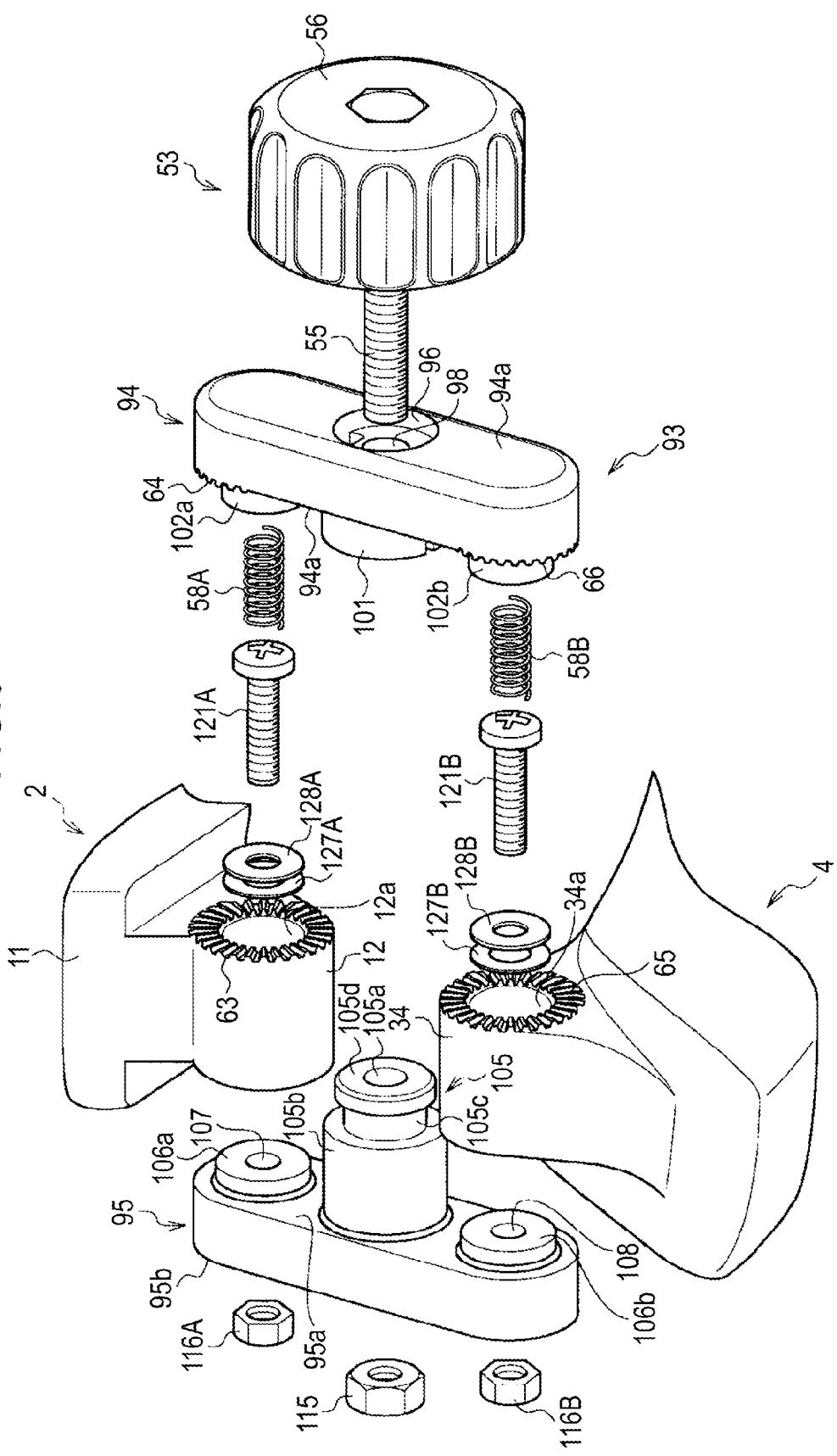
FIG. 9 is an exploded perspective view of a camera support device according to a fifth embodiment of the present invention.

FIG. 9 is a cross-sectional view of a camera support device according to the fifth embodiment of the present invention. FIG. 10 is a cross sectional view of a camera support device according to the fifth embodiment.

The camera support device 90 according to the fifth embodiment has a same configuration as that of the camera support device 60 according to the second embodiment except for a second rotating member 93. Thus, here, the second rotating member 93 will be described. In addition, to each part common to the camera support device 60, a same reference numeral is assigned, and a duplicate description thereof is omitted here.

The second rotating member 93 is formed by a first arm portion 94 and a second arm portion 95. By engaging the first arm portion 94 and the second arm portion 95 with the bearing portion 12 of the first rotating member 2 so as to be able to turn, the first rotating member 2 is supported by the second rotating member 93 so as to be able to turn.

The first arm portion 94 is formed in an approximately rectangular shape that is long and thin. The first arm portion 94 has an inner face 94a that faces the second arm portion 95 and an outer face 94b that is located on a side opposite to the inner face 95a. On the outer face 94b of the first arm portion 94, a concave portion 96 is disposed. This concave portion 96 is disposed on the center of the inner face 94a and is formed in a circular shape. In addition, in the concave portion 96, a through hole 98, which is formed by perforating the tightening screw 55 of the operation member 53, is open.

On the inner face 94a of the first arm portion 94, a fitting protrusion portion 101, a first protrusion shaft 102a, a second protrusion shaft 102b, a high serration 64, and a low serration 66 are disposed.

The fitting protrusion portion 101 is formed in a cylinder shape that protrudes from the inner face 95a so as to be approximately perpendicular to thereto. The through hole 101a of the fitting protrusion portion 101 communicates with the through hole 98 (see FIG. 10). In addition, on the inner face of the fitting protrusion portion 101, a retaining piece 101b is disposed. The retaining piece 101b is engaged with a cylinder-shaped protrusion 105 of the second arm portion 95, to be described later, so as to be slidable.

The first protrusion shaft 102a is disposed on one end of the first arm portion 94 in the longitudinal direction. The first protrusion shaft 102a is formed in a cylinder shape that protrudes from the inner face 94a of the first arm portion 94 to be approximately perpendicular thereto. The first protrusion shaft 102a is fitted into the bearing hole 12a of the first rotating member 2 to be slidable (see FIG. 10). In addition, in the first protrusion shaft 102a, a concave portion 103 into which the helical compression spring 58A is inserted is disposed.

The second protrusion shaft 102b is disposed on the other end of the first arm portion 94 in the longitudinal direction. The second protrusion shaft 102b, similarly to the first protrusion shaft 102a, is formed in a cylinder shape that protrudes from the inner face 94a of the first arm portion 94 to be approximately perpendicular thereto. The second protrusion shaft 102b is fitted into the bearing hole 34a of the support member 4 to be slidable (see FIG. 10). In addition, in the second protrusion shaft 102b, a concave portion 104 into which the helical compression spring 58B is inserted is disposed.

The high serration 64 is formed on the periphery of the first protrusion shaft 102a. The high serration 64 is formed by a convex portion and a concave portion extending in the radial direction of the first protrusion shaft 102a. This high serration 64 is engaged with the high serration 63 of the bearing portion 12. In other words, the first engagement portion 61 is configured by the high serration 64 and the high serration 63.

The low serration 66 is formed on the periphery of the second protrusion shaft 102b. The low serration 66 is formed by a convex portion and a concave portion extending in the radial direction of the second protrusion shaft 102b. This low serration 66 is engaged with a low serration 65 of the bearing portion 34. In other words, the second engagement portion 62 is configured by the low serration 65 and the low serration 66.

The second arm portion 95, similarly to the first arm portion 94, is formed in an approximately rectangular shape that is long and thin. The second arm portion 95 has an inner face 95a facing the first arm portion 94 and an outer face 95b that is located on a side opposite to the inner face 95a. On the inner face 95a of the second arm portion 95, a tube-shaped protrusion 105, a first protrusion shaft 106a, and a second protrusion shaft 106b are disposed.

The tube-shaped protrusion 105 protrudes from the center portion of the inner face 95a to be approximately perpendicular to thereto and is formed in an approximately cylinder shape. A tightening screw 55 of the operation member 53 passes through a through hole 105a of the tube-shaped protrusion 105. The tube-shaped protrusion 105 has a base end portion 105b that is formed to be continuous to the inner face 95a, an engagement peripheral face portion 105c that is formed to be continuous to the base end portion 105b, and a locking portion 105d that is formed to be continuous to the engagement peripheral face portion 105c.

The engagement peripheral face portion 105c is formed in a cylinder shape having a diameter smaller than the base end portion 105b. A retaining piece 101b of the first arm portion 94 is engaged with the engagement peripheral face portion 105c to be slidable. By engaging the retaining piece 101b with the engagement peripheral face portion 105c to be slidable, the first arm portion 94 is configured to be movable in a direction perpendicular to the inner face 94a in a state being connected to the second arm portion 95.

A locking portion 105d is formed in a circular shape having a diameter smaller than the base end portion 105b and greater than the engagement peripheral face portion 105c. This locking portion 105d engages with the retaining piece 101b of the first arm portion 94, whereby preventing the first arm portion 94 from being dropped out of the second arm portion 95. In other words, the movable range of the first arm portion 94 is the length of the engagement peripheral face portion 105c in the axial direction.

The first protrusion shaft 106a is disposed on one end of the second arm portion 95 in the longitudinal direction. The first protrusion shaft 106a is formed in a cylinder shape that protrudes from the inner face 95a of the second arm portion 95 to be approximately perpendicular thereto. The first protrusion shaft 106a is fitted into the bearing hole 12a of the first rotating member 2 to be slidable. In addition, a connection screw 121A that connects the second arm portion 95 and the first rotating member 2 to each other passes through a through hole 107 of the first protrusion shaft 106a.

The second protrusion shaft 106b is disposed on the other end of the second arm portion 22 in the longitudinal direction. The second protrusion shaft 106b is formed in a cylinder shape that protrudes from the inner face 95a of the second arm portion 95 to be approximately perpendicular thereto. The second protrusion shaft 106b is fitted into the bearing hole 34a of the support member 4 to be slidable. In addition, a connection screw 121B that connects the second arm portion 95 and the support member 4 to each other passes through a through hole 108 of the second protrusion shaft 106b.

Figure 10:
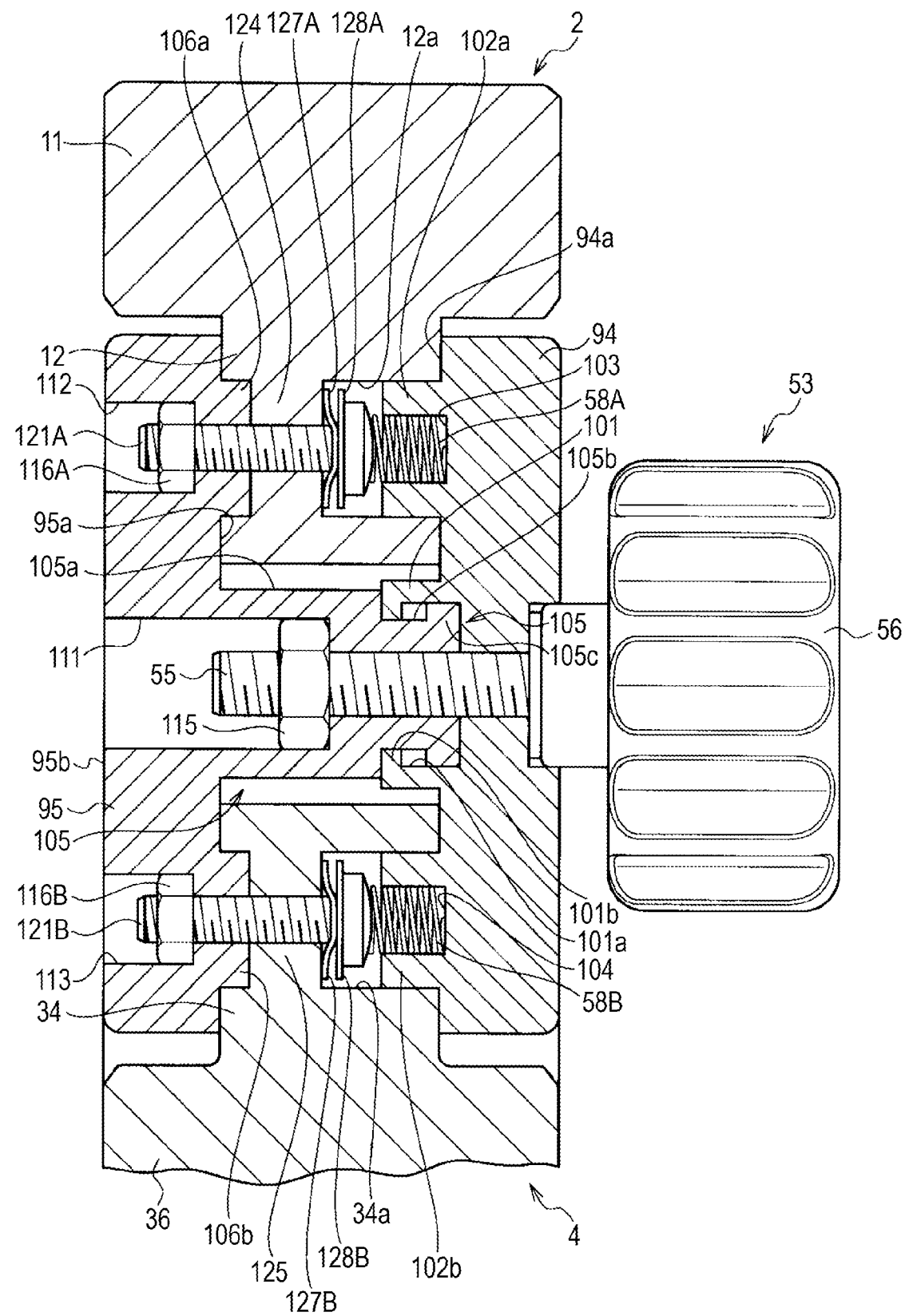
FIG. 10 is a cross-sectional view of a camera support device according to the fifth embodiment.

On the outer face 95b of the second arm portion 95, nut concave portions 111, 112, and 113 are disposed (see FIG. 10). The nut concave portion 111 is disposed in a position facing the tube-shaped protrusion 105 and communicates with the through hole 105a of the tube-shaped protrusion 105. To the nut concave portion 111, a nut 115 is fixed by using a fixing method by using an adhesive agent or the like. The fastening screw 55 of the operation member 53 screws into the nut 115.

The nut concave portion 112 is disposed in a position facing the first protrusion shaft 106a and communicates with the through hole 107 of the first protrusion shaft 106a. To the nut concave portion 112, a nut 116A is fixed by using a fixing method by using an adhesive agent or the like. The connection screw 121A screws into the nut 116A.

The nut concave portion 113 is disposed in a position facing the second protrusion shaft 106b and communicates with the through hole 108 of the second protrusion shaft 106b. To the nut concave portion 113, a nut 116B is fixed by using a fixing method by using an adhesive agent or the like. The connection screw 121B screws into the nut 116B.

As illustrated in FIG. 10, a screw fixing portion 124 is disposed in the bearing portion 12 of the first rotating member 2. This screw fixing portion 124 is formed to be continuous to the inner face forming the bearing hole 12a. A through hole through which the connection screw 121A passes is disposed in the screw fixing portion 124.

The connection screw 121A screws into the nut 116A through the screw fixing portion 124 and the first protrusion shaft 106a. Between a head portion of the connection screw 121A and the screw fixing portion 124, a wave washer 127A and a flat washer 128A are interposed. Accordingly, the first rotating member 2 is connected to the second arm portion 95 to be rotatable. Thus, an appropriate resistance force is generated in the rotation operation of the first rotating member 2.

In the bearing portion 34 of the support member 4, a screw fixing portion 125 is disposed. This screw fixing portion 125 is formed to be continuous to the inner face forming the bearing hole 12a. In the screw fixing portion 125, a through hole through which the connection screw 121B passes is disposed.

The connection screw 121B screws into the nut 116B through the screw fixing portion 125 and the second protrusion shaft 106b of the second arm portion 95. Between a head portion of the connection screw 121B and the screw fixing portion 125, a wave washer 127B and a flat washer 128B are interposed. Accordingly, the second arm portion 95 is connected to the support member 4 to be rotatable. Thus, an appropriate resistance force is generated in the rotation operation of the second arm portion 95.

One end of the helical compression spring 58A is brought into contact with the first arm portion 94, and the other end thereof is connected to the head portion of the connection screw 121A. In addition, one end of the helical compression spring 58B is brought into contact with the first arm portion 94, and the other end thereof is connected to the head portion of the connection screw 121B. The first arm portion 94 is biased in a direction being separated from the second arm portion 22 by the helical compression springs 58A and 58B.

According to the camera support device 90, the same advantages as those of the camera support device 1 according to the first embodiment can be acquired. In other words, the fixing and the releasing of the first rotating member 2 and the second rotating member 93 can be performed by the operation member 53, and the fixing and the releasing of the first rotating member 2 and the second rotating member 93 can be performed at different times.

In addition, the second arm portion 95 of the camera support device 90 is connected to the first rotating member 2 and the support member 4 to be able to be turned by allowing the first rotating member 2 and the support member 4 to have appropriate resistant forces. Accordingly, when the first rotating member 2 and the second rotating member 93 are turned, an excellent operation feeling can be acquired. In addition, the first rotating member 2 and the second rotating member 93 can be prevented from naturally turning in a case where the fixing of the first rotating member 2 and the second rotating member 93 are released.

The present invention is not limited to the above-described embodiments represented in the drawings, and various changes can be made therein without departing from the basic concept of the invention defined by the claims. For example, the depth of the groove of the serration configuring the engagement portion or a portion forming the serration may be appropriately set.

In addition, in the above-described embodiments, the engagement depth of the first engagement portion is set to be greater than that of the second engagement portion. However, the engagement depth of the first engagement portion may be set to be less than that of the second engagement portion. In such a case, the fixing of the first rotating member is released first, and then the fixing of the second rotating member is released.

The present application contains subject matter related to that disclosed in Japanese Priority Patent Application JP 2009-049686 filed in the Japan Patent Office on Mar. 3, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera support device comprising:
a first rotating member to which an imaging device is fixed;
a second rotating member that has a first arm portion and a second arm portion interposing the first rotating member therebetween and supports the first rotating member to be able to be turned by the first arm portion and the second arm portion;
a support member that is interposed between the first arm portion and the second arm portion and supports the second rotating member to be able to turn;
an operation member that changes a distance between the first arm portion and the second arm portion;
a first engagement portion that is formed by a first serration formed on a first contact surface of at least one of the first arm portion and the second arm portion and the first rotating member;
a second engagement portion that is formed by a second serration formed on a second contact surface of at least one of the first arm portion and the second arm portion and the support member and is set to have an engagement depth that is different from that of the first engagement portion;
a biasing member that allows the first arm portion and the second arm portion to be separated from each other by biasing at least one of the first arm portion and the second arm portion;
wherein the first engagement portion has the engagement depth that is greater than that of the second engagement portion;
wherein the first serrations of the first engagement portion have grooves that are deeper than that of the second serration of the second engagement portion;
wherein the first engagement portion is formed by the first serration formed on contact surface of the first arm portion and the first rotating member,
wherein the second engagement portion is formed by the second serration formed on a contact surface of the first arm portion and the support member, and
wherein the second arm portion is connected to the first rotating member and the support member to be able to respectively turn.

2. The camera support device according to claim 1,
wherein the first engagement portion is formed by first serrations that are formed in contact surfaces of both the first arm portion and the second arm portion and the first rotating member,
wherein the second engagement portion is formed by the second serration that is formed on a contact surface of one of the first arm potion and the second arm portion and the support member, and
wherein the first serrations of the first engagement portion have a same shape as that of the second engagement portion.